April 12, 1966   W. H. McGARVEY ETAL   3,246,188
AMORTISSEUR WINDING FOR SYNCHRONOUS MACHINES
Filed Nov. 9, 1964   3 Sheets-Sheet 1

INVENTORS
WILLIAM H. McGARVEY
ROBERT V. SHEPHERD
PRESTON B. THAMES

BY *James R. Campbell*

ATTORNEY

April 12, 1966 W. H. McGARVEY ETAL 3,246,188
AMORTISSEUR WINDING FOR SYNCHRONOUS MACHINES
Filed Nov. 9, 1964 3 Sheets-Sheet 2

INVENTORS
WILLIAM H. McGARVEY
ROBERT V. SHEPHERD
PRESTON B. THAMES

BY James R Campbell

ATTORNEY

INVENTORS
WILLIAM H. McGARVEY
ROBERT V. SHEPHERD
PRESTON B. THAMES
BY
*James L. Campbell*
THEIR ATTORNEY

United States Patent Office 3,246,188
Patented Apr. 12, 1966

3,246,188
AMORTISSEUR WINDING FOR SYNCHRONOUS MACHINES
William H. McGarvey and Preston B. Thames, Schenectady, N.Y., and Robert V. Shepherd, deceased, late of Schenectady, N.Y., by Anne C. Shepherd, executrix, Schenectady, N.Y., assignors to General Electric Company, a corporation of New York
Filed Nov. 9, 1964, Ser. No. 411,669
13 Claims. (Cl. 310—183)

This patent application is a continuation-in-part of our earlier patent application Serial No. 107,566, filed May 3, 1961, and now abandoned in favor of the present application.

The invention described herein relates to dynamoelectric machines and more particularly to an improved arrangement for connecting conductor bars to end rings disposed on opposite ends of a rotor.

The rotor for synchronous machines, such as a sine wave generator or synchronous motor, includes a magnetic core having slots containing the field and amortisseur windings, the primary function of the latter being to provide stability to the machine by damping fluctuations or pulsations in both the load and the prime mover.

In constructions of the sine wave generator type, the bars of the amortisseur winding normally are placed in the same slots as the field winding and the bar ends terminate in end rings disposed on opposite sides of the magnetic core. Usually each bar is shaped to the same configuration as a slot wedge and serves the dual function of holding the conductors in the slot while also carrying out its main purpose of a damping agent. As a result, the bar generally is of a trapezoidal configuration which is driven into each slot and is spaced from the coil conductors by a spacer having insulating characteristics. To secure the bars to the end rings, some practices include wrapping a copper screen of the desired thickness over the coil end turns and securing the bar ends therein by solder or other bonding material.

Machines of this type operate very satisfactorily, but are subject to the disadvantages of not allowing for the degree of thermal expansion in the bars necessary when the machine operates under conditions which induce large currents in the amortisseur winding. The bars are wedged solidly in the slots and the forces generated from expansion can assume magnitudes sufficient to cause rupture of the copper ring since they are far in excess of the mechanical resistance offered by the relatively weak bond provided by the solder.

Even when such machines are designed for single phase operation, the amortisseur bars often carry current equal to or even greater than that flowing in the D.-C. exciting winding, and the electrical losses resulting from the consequent heating contribute substantially to the total electrical losses in the machine. Although the bars are spaced from the field winding conductors by an insulating spacer, heat nevertheless penetrates the barrier and serves to accelerate the aging of the ground insulation on the conductors. In addition to this, it restricts the dissipation of heat directly from the slot area into the air gap where it otherwise could be carried away conveniently by the ventilating air.

Still another important disadvantage arises in those instances where a field winding conductor must be replaced since it is necessary to remove the copper screen and solder comprising the end ring to permit removal of the old and replacement of a new conductor. Not only does this increase the repair costs since the complete ring must be removed and replaced, but since heat must be used to melt the solder, the possibility exists that the insulation on the coil end turns will be damaged during the operation of removing the end ring from its position around the coil end turns.

Although some of the above problems are not encountered in synchronous motors wherein the amortisseur bars are not in the same slots as the bar conductors, special connector designs nevertheless have been developed for insertion between the bars and the end rings to absorb the axial forces exerted by the bars as they expand and contract during normal machine operation. These connectors perform their intended function satisfactorily but the costs in terms of materials and labor necessary to fabricate and install the connectors between each bar and the end rings add materially to the total costs for the machine.

A similar problem exists in the rotor end ring areas of squirrel cage and rotor end turn areas of other types of induction motors. As the winding conductors in the slots axially expand and contract under the influence of heat generated in the motor, the short circuiting end rings to which they are attached distort, thus causing separation of individual conductors from the end rings at the point when the two are brazed together. Also, manufacturing problems of substantial scope arise when the bar conductors initially are brazed to the end rings. As is known to those skilled in the art, as the conductors successively are joined by brazing to the solid end rings, heat transmitted to the individual conductors as brazing takes place, causes them to separately expand, then contract, as that localized portion of the end ring and conductors heats and cools. The same conditions arise as the next adjacent conductors are brazed in place.

This action often causes fracture at the juncture of the bar and end ring, thus requiring the operator to repeat the brazing operation to assure a strong bond between all the conductors and end rings. Not only are the costs prohibitive for doing so but the manufacturing procedures involved give rise to problems relating to controlling the quality of the brazed joints.

It therefore is apparent that the need exists for an improved design of end ring which will eliminate the disadvantages inherent in prior art designs while providing a construction capable of offering better machine performance and decreased costs.

The primary object of our invention therefore is to provide an end ring design incorporating features of flexibility for accommodating thermal action in the bars during both manufacture and subsequent operation of the machine.

Another object of our invention is to locate the bars of an amortisseur winding in the magnetic core at a position remote from the field winding conductors.

Still another object of our invention is to provide an amortisseur winding construction in a rotor mechanically independent of the other winding in the magnetic core.

Another object of our invention is the provision of an improved squirrel cage rotor designed to accommodate the forces generated in the winding conductors as they move axially in response to thermal action.

We carry out the above objects of our invention through the provision of flexible connectors constituting a part of the end rings located on opposite ends of the magnetic core. Amortisseur bars and/or conductors in the slots or openings provided in the rotor of dynamoelectric machines, are connected to the flexible connectors, which because of their resiliency, allow axial movement of the bars when thermal expansion and contraction takes place. To provide for increased heat dissipation from both the conductors and amortisseur winding bars, the latter preferably are located in separate slots formed in the teeth of the rotor.

While the specification concludes with claims particularly pointing out and distinctly claiming the subject matter which we regard as our invention, it is believed the invention will be better understood from the following description taken in connection with the accompanying drawing in which:

Figure 1:
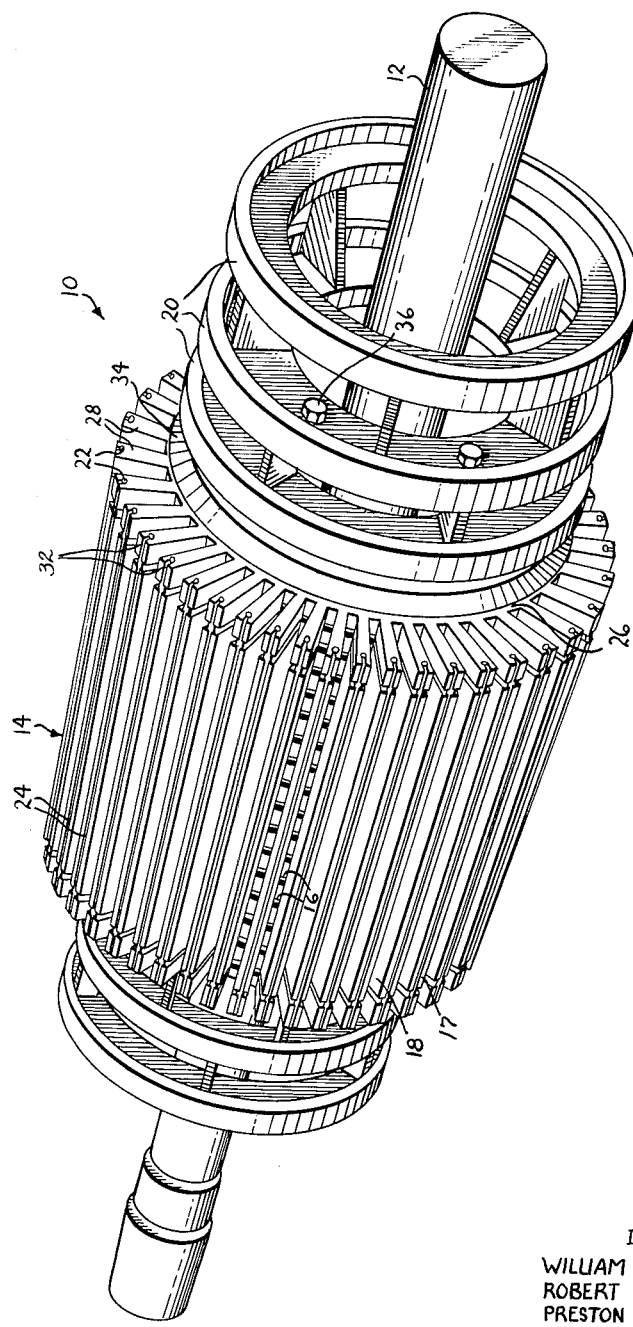
FIGURE 1 is a perspective view of a rotor for a sine wave generator chosen to illustrate the features of this invention.

Referring now to the drawing wherein like reference characters designate like or corresponding parts throughout the several views there is shown in FIGURE 1, a rotor 10 comprising a shaft 12 supporting a multitude of magnetic laminations 14 preferably spaced along their axial length to provide air ducts 16 used in ventilating the machine during operation. The core is equipped with axially extending slots 18 for receiving conductors comprising the main field winding for the machine. The illustration of FIGURE 1 does not show the conductors although it will be evident to those skilled in the art that this type of machine preferably includes inner and outer bar-type conductors disposed in each slot and having end turns of considerable length which overhang the end of the core to a position convenient for making the lead and other connections, depending on the type of operation required by the particular machine. Other well known configurations of windings also are used.

In order to support the heavy coil end turns and to secure them in a position for preventing their displacement when subjected to mechanical and magnetic vibratory forces during operation, a series of support rings 20 are mounted on the shaft 12 and have an outer diameter falling in line with the bottom of the conductor slots. After the conductors are placed in the slots and the connections made, the end turns are preferably bound with resin treated glass tape, not shown, of the type disclosed in Coggeshall et al. Patent 2,747,118, assigned to the same assignee as the present invention, which serves to hold the end turns against displacement.

Figure 2:
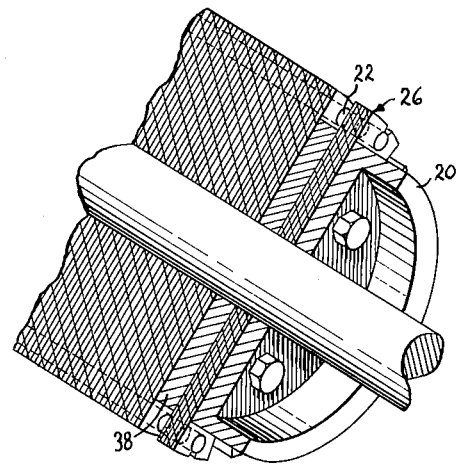
FIGURE 2 is an end view, partly in section, illustrating how the bars of the amortisseur winding are secured in the outwardly extending fingers of copper laminations.

In addition to the main field winding, an amortisseur winding is used for providing stability to the machine. In the preferred embodiment disclosed in FIGURE 1, the teeth 17 which form the slots 18 for the conductors, are designed to project outwardly into the air gap a distance slightly greater than that when the amortisseur bars are located in the same slots as the conductors. Such tooth extension however, is not absolutely essential to proper use of the invention. In order to provide independence of the amortisseur winding, to allow unimpeded axial expansion and contraction of the amortisseur bars, and to permit quick and easy removal of the insulated conductors when necessary, the bars 22 are located in axial openings 24 in the outer end of the teeth 17. The axial openings may assume any configuration compatible with the characteristic requirements and efficient design needed in a particular machine. Such openings may be round, square, rectangular, trapezoidal, elliptical, and the like. As shown in FIGURES 1 and 2, the bars are designed to project outwardly from opposite ends of the magnetic core a short distance for a purpose more fully described hereafter.

As indicated in the preceding portion of the specification, prior constructions rigidly fix each amortisseur bar in the conductor slot and the ends thereof were anchored firmly in a substantially solid copper end ring disposed on opposite sides of the magnetic core. Because of this, only limited thermal expansion and contraction of the bars could be tolerated, but in most cases, it did not present mechanical problems because the machine was cooled to such a high degree that thermal action in damaging proportions did not take place. However, complete removal of the amortisseur winding was required when it was necessary to replace a damaged coil in the machine.

We overcome these disadvantages by providing on each end of the core, a multitude or group of copper laminations 26 of substantially the same size and shape as the steel laminations comprising the magnetic core. The cross sectional area of each finger 28 is preferably, although not necessarily the same as the cross sectional area of each bar 22, and the solid or body portion 30 of the laminations appearing between the teeth and the bore diameter, is chosen of a size sufficient to carry the currents which will flow during machine operation. The ends of the fingers of the copper laminations are brazed together and the ends of the amortisseur bars are brazed in openings 32 provided in the finger portion of the laminations. As in conventional constructions, the steel laminations of the magnetic core are held under permanent compression by heavy steel flanges or rings 34, shown schematically herein, positioned on opposite ends of the core, and bolts 36 which extend through the core body. Since the copper laminations also must be held permanently in a fixed position, they are subjected preferably to the same compressive force. Spacer 38 spaces the copper laminations from the magnetic core. The spacer on each end of the core may comprise a multitude of separate bars which extend almost to the bore of the laminations so that they also act as a fan for pumping air between the copper and steel punchings. Alternatively, the innermost ends may terminate in a hub, if desired. Since the spacer serves to hold the steel laminations under compression, the copper laminations may not be and need not be subjected to the same degree of compressive force.

These new structural features of locating the amortisseur bars in the teeth and utilizing a combined flexible finger-end ring device taking the form of copper laminations, makes possible greatly increased expansion and contraction of the bars during rotor operation. Since the flexible fingers match the teeth in design and are located next to the magnetic core, any damaged conductors can be removed quickly and easily without disturbing any part of the amortisseur winding. The removal of each amortisseur bar from the conductor slot to the teeth also lessens the aging of the conductor ground insulation due to amortisseur currents.

To illustrate the advantages of this invention, a generator having a rating of 2-pole, 1650 k.v.a., single phase, 1170 r.p.m., and 2000 volts required a prior art end ring of the type comprising a copper screening utilizing solder for bonding the ends of the amortisseur bars, having approximate dimensions of 1″ in a radial direction and 8″ axially of the rotor to provide a cross sectional area of 8 square inches. Not only are the costs for the materials great because of the large amount of copper used but the labor costs are high because of the requirement of completely penetrating the copper screening with solder for bonding purposes. By employing the invention described herein in the same size machine, it will be apparent that the only construction needed is the addition of several copper laminations on each end of the rotor, spaced therefrom by a spacer, and including openings into which the ends of the amortisseur bars are secured, and thus eliminating the heavy ring of the prior art. The decided advantage gained from a cost standpoint is that the material costs are less because the need for solder and screening is eliminated and since the laminations and the spacers on each end of the rotor core can be assembled during the normal manufacturing process of the machine, it will be evident that decided advantages in labor costs can be realized. These benefits are in addition to those previously described which permit improved performance and make possible quick and easy removal of damaged conductors when necessary.

Figure 4:
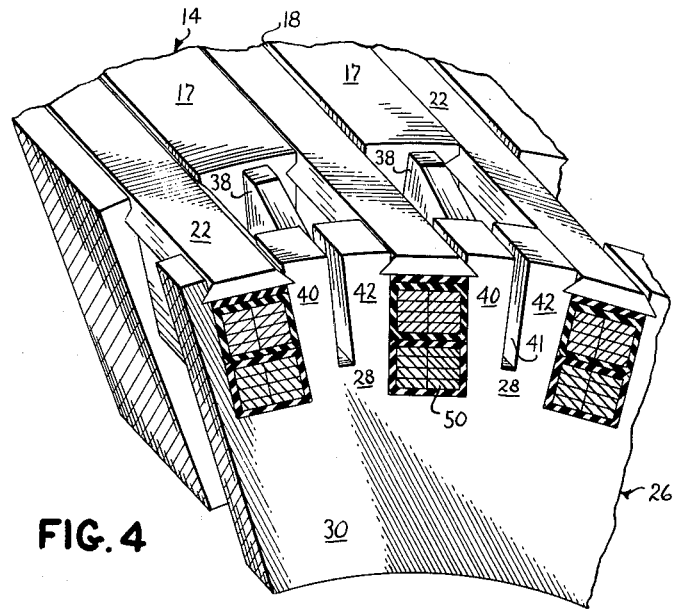
FIGURE 4 is a modification of the invention.

In some instances it is desirable to have the amortisseur bars serve the dual function of a wedge and form a part of the amortisseur winding, so that its retention in the conductor slot is necessary. In this construction, the copper laminations described above are still retained on each end of the rotor. Since any arrangement used should allow for removal of damaged conductors without dismantling the complete amortisseur winding, it has been found that a construction of the type shown in FIGURE 4 effectively serves the purpose. As illustrated in the partial view, the copper laminations are the same as those used in the previous embodiment. The fingers 28 are formed integrally with each lamination and a multitude of such laminations are assembled together on opposite ends of the core. However, instead of providing an axial hole near the outer end of each finger, each tooth is equipped with a saw cut 41 extending in an axial and radial direction. A pair of segments 40 and 42 thus comprise each finger. Since it is necessary to provide for quick and easy removal of the insulated conductors when necessary, the adjacent segments of each tooth form an opening slightly greater than the slot opening for the conductors 50. Each amortisseur bar 22 in each slot is then brazed to the adjacent finger segments, thus providing a construction which allows axial movement of the bars when thermal action takes place in addition to permitting removal of the insulated conductors without disturbing the amortisseur winding. Moreover, because of the loose fit between the sides of the segments and the conductors, the segments can move without wearing insulation from the conductor surface. In the event the conductor to be removed is wedged so tightly in the slot that removal of the wedge is necessary, the only connection which needs be broken is that where the bar end is brazed to the overlapping finger segments 40 and 42.

Although the above disclosure of the invention describes an amortisseur winding arrangement with respect to a distributed winding rotor in a synchronous motor or generator, it will be apparent that the teachings are applicable equally to other types of synchronous machines and to wound rotor and squirrel cage induction motors of similar construction. The invention also can be applied to a dynamoelectric machine wherein the distributed winding and the amortisseur winding form the stationary or stator portion of the machine. In this case, the flexible fingers simply would project radially inward, rather than outward, to receive either the slot conductors or amortisseur bars, depending on the kind of machine to which the invention is being applied.

Figure 3:
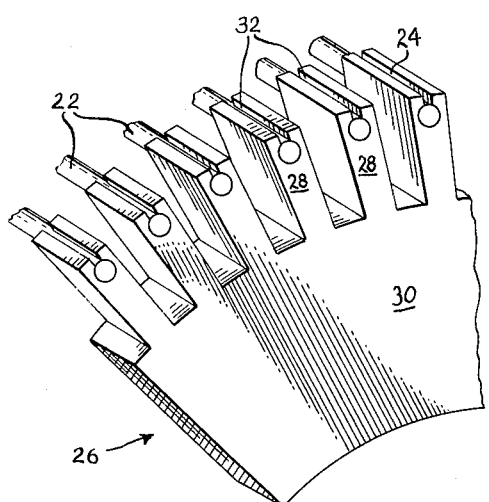
FIGURE 3 is a perspective view of the copper laminations disposed on opposite ends of the rotor and illustrating only a portion of the flexible fingers which extend outwardly from the laminations.

Obviously, the invention is directly applicable to a salient pole synchronous machine where the amortisseur bars terminate in a short circuiting end ring on opposite sides of the rotor. The design of end ring will be the same, except for variations in size, as that disclosed in FIGURES 1 through 3. Instead of terminating in either a solid or segmental end ring of the prior art, the amortisseur bars would be brazed into the fingers projecting outwardly from the main body of the end ring.

Figure 5:
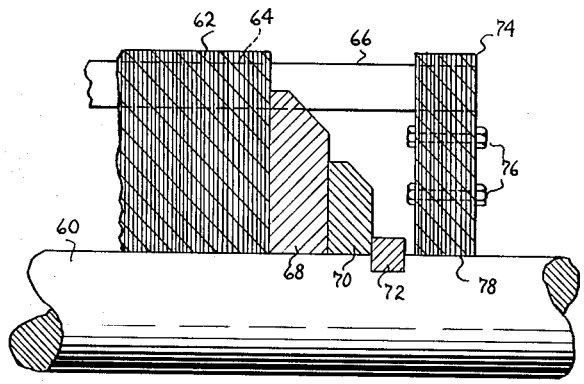
FIGURE 5 is a side view in elevation, partly in section, illustrating an end portion of an induction motor.
Figure 6:
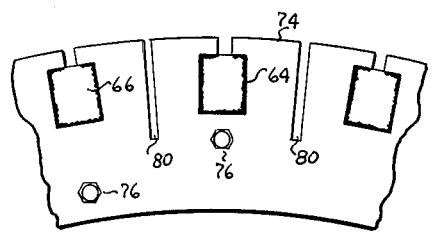
FIGURE 6 is an end view of the motor shown in FIGURE 5.

FIGURES 5 and 6 illustrate application of the teachings of the invention to an induction motor rotor. As indicated in the introductory portion to the specification, the primary manufacturing problem involved in brazing the slot conductors to oppositely disposed end rings results from the high temperatures generated during the brazing operation. The heat is transmitted directly into the particular conductor being brazed to the end ring and causes it to expand and exert a force at the point where the braze was made. These forces are often sufficiently great to cause fracture at the brazed joint during the time the next adjacent conductors are being brazed to the end rings.

This invention overcomes the above described manufacturing problem by employing flexible fingers integrally joined with the end ring. Referring to FIGURES 5 and 6, a shaft 60 supports a magnetic core consisting of a multitude of laminations 62 having slots 64 for receiving axially extending conductors 66. Obviously, the design of the slots and the conductors inserted therein may assume any conventional configuration. Finger flange 68, flange ring 70 and a locking ring 72 coact with similar parts on the other end of the core to hold the laminations under compression.

In lieu of providing a solid end ring to which the individual conductors are brazed as in prior art constructions, the end ring 74 of this invention is made of a multiplicity of copper laminations preferably having the same diameter and slot configuration as those laminations comprising the magnetic core. The end ring slot design may vary from that in the core to permit ease in manufacture, if desired. The end ring laminations may be held together by any conventional means, such as bolts 76 or by brazing, or the like. The slots 64 in the end ring are of the same configuration as those in the magnetic core and the conductors 66 are chosen of a length sufficient to extend into the end ring slots and are brazed therein during the manufacturing cycle. To provide strength to the joint, the braze preferably should extend completely around the conductor. The inner diameter of the end ring may be of any size, depending on the currents expected to be carried during operation, and it may rest on the shaft as indicated at 78 or have a diameter substantially larger than the shaft and therefore be located in spaced relationship therewith. Again, depending on the size of the machine, the shaft may be equipped with a spider-like arrangement of rings, such as that shown in FIGURE 1, for supporting the end rings 74.

To accommodate the axially directed forces in the conductors as they expand and contract during machine operation, the laminations of the end ring are equipped with axial and radially directed slits 80 located between each of the slots which contain the conductors in the rotor. Since the fingers formed by the slits 80 are flexible, each conductor 66 is allowed to move throughout its complete range when expanding and contracting, without adversely affecting the end rings 74 or the joint made between the end ring and each individual conductor. The freedom of movement thus provided imparts great flexibility to conductors and end ring system and accordingly results in a more reliable machine.

Although the preferred embodiment includes placing each of the conductors within a slot provided in the end rings and then brazing them thereto, it will be apparent the conductors may be brazed or otherwise secured to the side of the top surface of the end ring and still take advantage of the flexibility characteristics of the fingers provided on the outer surface of the end rings. Also, a shoulder or ledge extending part ways through the end ring may be employed as a seat on which the conductors rest during the brazing and subsequent motor operation.

Figure 7:
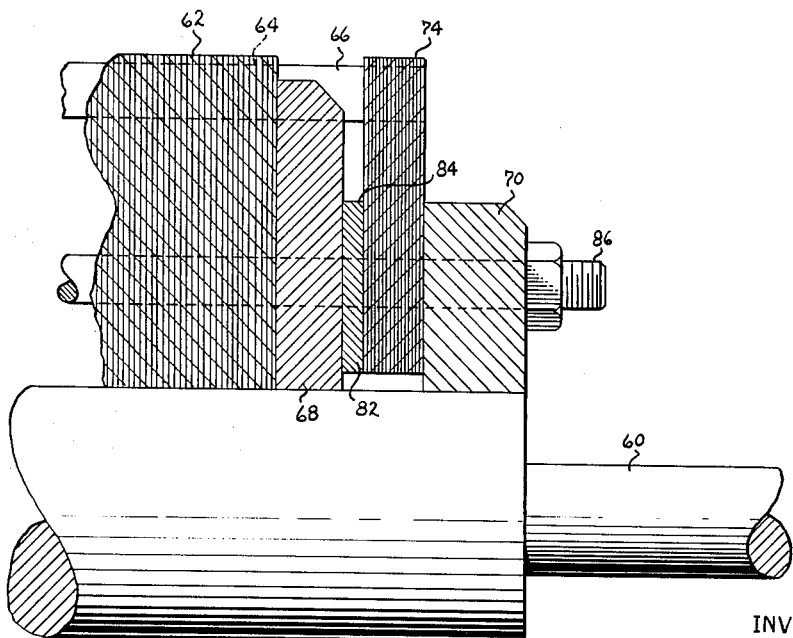
FIGURE 7 is a modification showing a slightly different arrangement for securing the end ring in position on one end of a rotor.

The modification illustrated in FIGURE 7 shows how the laminated end ring may be positioned inwardly of the flange rings employed in holding the laminated magnetic core under permanent compression. As shown, the clamping finger flange 68 is placed against the laminated core in the usual manner. A spacer comprising either a solid or laminated ring 82 then is placed over the shaft and in direct contact with the finger flange 68. It will be noted that its outer diameter 84 is approximately the same as the flange ring 70 used for holding the complete laminated stack under pressure. The spacer is chosen of an axial thickness sufficient to permit the fingers of the end ring to move inwardly through the full range of conductor contraction when cooling takes place. By utilizing this kind of design, the requirement for securing the end ring laminations into an integrated mass need not be considered because the flange ring 70 effectively performs the function of compressing the laminations to the same level as those in the magnetic core. Depending on the design of the machine, if a locking ring is not used for holding the pressure in the laminated stack, axially extending through-bolts 86 may be used for maintaining the pressure.

The teachings herein are applicable to turbine-generator constructions. In such constructions, the rotor usually is machined from a solid forging, and preferably, the slot for the amortisseur bars in the teeth should be milled to a square or rectangular configuration, although other slot designs could be used. It also may be desirable to machine in a wedge groove in order to retain the amortisseur winding bar which would be inserted in each slot.

In some laminated constructions, certain peripheral sectors do not include slots for the conductors and in such cases, the openings for amortisseur bars need not be provided in those areas.

In view of the above, it will be apparent that many modifications and variations are possible in light of the above teachings. It therefore is to be understood that within the scope of the appended claims the invention may be practiced otherwise than as specifically described.

What we claim as new and desire to secure by Letters Patent of the United States is:

1. A rotor for a dynamoelectric machine comprising:
   a shaft supporting at least one magnetic core,
   a field winding on said core,
   an amortisseur winding consisting of axially extending bars positioned in the core,
   an end ring located on opposite ends of the core, and, radially projecting flexible devices thereon to which the bars are connected for permitting thermal expansion and contraction thereof when the machine is placed in operation.

2. A rotor for a dynamoelectric machine comprising:
   a shaft supported magnetic core having conductor slots in its peripheral surface,
   conductors in said slots forming the field winding for the rotor,
   an amortisseur winding in said core comprising a plurality of bars extending axially thereof,
   a group of laminations on opposite ends of the core having a body portion and flexible projections extending radially outward from said portions,
   means connecting opposite ends of said bars to said projections,
   each of said projections having a cross sectional area of a size sufficient to carry the current flowing in said amortisseur winding when the rotor is placed in operation.

3. A rotor for a dynamoelectric machine comprising:
   a shaft supporting a magnetic core having conductor slots in its peripheral surface,
   conductors comprising the field winding for the rotor in said slots,
   an amortisseur winding consisting of a plurality of bars equal to the number of slots positioned in said core,
   end rings for said bars comprising a plurality of stacked laminations of the same design as laminations in the magnetic core and positioned on opposite sides thereof,
   means connecting opposite ends of said bars to flexible fingers integrally connected with the end rings for permitting axial expansion and contraction of the bars when the rotor is placed in operation.

4. The combination according to claim 3 wherein said bars are positioned in axial extending openings formed in the teeth of the magnetic core.

5. The combination according to claim 3 wherein the bars are positioned in each of said slots radially outward of said conductors.

6. A rotor for a dynamoelectric machine comprising:
   a shaft supporting a magnetic core having conductor slots in its peripheral surface,
   conductors comprising the field winding of the rotor in said slots,
   An amortisseur winding consisting of a plurality of bars each being positioned in an axially extending opening provided in each tooth on the core,
   a group of copper laminations of substantially the same design as the laminations in the core and positioned in opposite ends thereof,
   a spacer between the core and copper laminations,
   each of said laminations comprising a body portion and flexible fingers integrally formed therewith and projecting radially outward therefrom,
   an opening in each of said fingers of substantially the same size as a bar,
   means securing each bar in the finger opening so that when the bars expand and contract axially during operation of the rotor, the fingers are caused to bend and absorb the forces resulting from thermal action,
   each of said fingers having a cross sectional area at least equal to the cross sectional area of its corresponding bar and the body portion having a cross section area sufficient to carry the current circulated through the amortisseur winding during operation of the rotor.

7. A rotor for a dynamoelectric machine comprising:
   a shaft supporting a magnetic core having conductor slots in its peripheral surface,
   conductors comprising the field winding for the rotor in said slots,
   an amortisseur winding consisting of a plurality of bars each of which is placed above said conductors in each slot,
   a group of copper laminations disposed on opposite ends of said rotor and comprising a body portion having integrally formed fingers projecting outwardly therefrom,
   a spacer between said copper laminations and said core,
   each of said fingers being split radially and the segments of adjacent fingers being formed in a manner to encompass the end turn of the conductor at each slot,
   each of said bars in said slots extending outwardly from opposite ends of the core and connected to the fingers encompassing said conductors, thereby allowing for bar thermal expansion and contraction when the rotor is placed in operation.

8. A magnetic core for a dynamoelectric machine comprising:
   a plurality of laminations having slots therein for receiving conductors comprising a winding,
   an amortisseur winding including axially extending conductor bars in slots in said laminations,
   short circuiting end rings on opposite sides of said core,
   each of said end rings comprising a multiplicity of laminations connected together and having radially extending slits defining fingers,
   an opening in each of said fingers for receiving the ends of the amortisseur bars,
   said fingers having characteristics of flexibility for permitting expansion and contraction of each of said bars when subjected to forces resulting from thermal changes therein.

9. A rotor for a dynamoelectric machine comprising:
   a shaft supporting at least one magnetic core,
   a winding including current carrying conductors in said core,
   short circuiting end rings on opposite ends of said core, each of said end rings comprising a multiplicity of laminations having outwardly extending flexible fingers, means securing each of said conductors respectively to said fingers to accommodate the forces resulting from conductor expansion and contraction when the rotor operates in said machine.

10. A rotor for a dynamoelectric machine comprising:
a shaft supporting a magnetic core,
a winding including conductors disposed in slots formed by adjacent teeth in said core,
end rings on opposite ends of said core,
each of said end rings comprising a body of stacked laminations having axially and radially extending slits therein defining radially projecting flexible fingers,
an opening in each of said fingers, and
means connecting each of said conductors to its respective finger for permitting axial expansion and contraction of said conductor when subjected to the forces resulting from thermal action.

11. The combination according to claim 10 wherein the inner diameter of each of said rings is positioned in spaced relationship with said shaft.

12. The combination according to claim 10 wherein the inner diameter of each of said rings is substantially the same as the shaft diameter and is supported by said shaft when the rotor is in operation.

13. A rotor for a dynamoelectric machine comprising:
a shaft supporting a magnetic core,
a winding including conductors disposed in slots in said core,
a finger flange on opposite ends of said core,
an end ring consisting of a multiplicity of laminations positioned on opopsite ends of said core but held in spaced relationship with said flange by a spacing element,
a clamping ring in contact with the exposed surfaces of each of said end rings,
means coacting with said clamping rings for maintaining a predetermined pressure in the core and end ring laminations,
each of said end rings comprising a multiplicity of laminations having radially extending slits near the end ring outer surface,
each pair of slits defining radially projecting flexible fingers therebetween,
an opening in each of said fingers, and
means securing each of said conductors in the opening provided in the respective fingers, the arrangement being such that the conductors are permitted to expand and contract when subjected to the influence of heat.

No references cited.

ORIS L. RADER, *Primary Examiner*.